(12) United States Patent
Hayes et al.

(10) Patent No.: US 8,152,674 B2
(45) Date of Patent: Apr. 10, 2012

(54) AUXILIARY LUBRICATION PUMP FOR CARRIERS

(75) Inventors: Brian D. Hayes, Newark, OH (US); Robert J. Martin, III, Newark, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 840 days.

(21) Appl. No.: 12/192,281

(22) Filed: Aug. 15, 2008

(65) Prior Publication Data

US 2010/0041505 A1    Feb. 18, 2010

(51) Int. Cl.
*F16H 57/04*    (2010.01)
(52) U.S. Cl. .................... 475/160; 475/159; 184/6.12
(58) Field of Classification Search .............. 475/159, 475/160; 184/6.12, 6.3
See application file for complete search history.

(56) References Cited

U.S. PATENT DOCUMENTS

| | | | | |
|---|---|---|---|---|
| 1,921,769 A * | 8/1933 | Morgan | | 184/6.12 |
| 2,627,190 A * | 2/1953 | Bottcher | | 475/88 |
| 3,470,767 A * | 10/1969 | Gray | | 475/160 |
| 3,529,698 A * | 9/1970 | Nelson | | 184/6.12 |
| 3,767,014 A * | 10/1973 | Drone | | 184/6.12 |
| 3,887,037 A * | 6/1975 | Haluda et al. | | 184/6.12 |
| 5,372,213 A * | 12/1994 | Hasebe et al. | | 180/65.6 |
| 5,584,773 A * | 12/1996 | Kershaw et al. | | 475/160 |
| 5,643,127 A * | 7/1997 | Yoshii et al. | | 475/160 |
| 5,662,188 A * | 9/1997 | Ito et al. | | 184/6.3 |
| 6,843,746 B2 | 1/2005 | Hayes et al. | | |
| 6,991,574 B2 | 1/2006 | Martin, III | | |
| 7,465,158 B2 * | 12/2008 | Weston | | 418/206.2 |
| 7,686,137 B2 * | 3/2010 | Tominaga et al. | | 184/6.12 |
| 7,866,433 B2 | 1/2011 | Martin, III et al. | | |
| 7,963,186 B2 * | 6/2011 | Hayes et al. | | 74/467 |
| 2009/0026014 A1 | 1/2009 | Martin, III et al. | | |
| 2009/0211386 A1 | 8/2009 | Hayes et al. | | |
| 2010/0041505 A1 | 2/2010 | Hayes et al. | | |

OTHER PUBLICATIONS

U.S. Appl. No. 13/046,943, filed Mar. 14, 2011.

* cited by examiner

*Primary Examiner* — Tisha Lewis
(74) *Attorney, Agent, or Firm* — Carlson, Gaskey & Olds, PC

(57) ABSTRACT

A carrier assembly includes an auxiliary lubrication pump that lubricates gear components positioned within an internal cavity of a carrier housing. A differential gear assembly is positioned within the internal cavity to rotate about an axis. The auxiliary lubrication pump includes a first gear that is driven by the differential gear assembly about the axis and a second gear that is driven by the first gear. The first and second gears of the auxiliary lubrication pump cooperate to direct and control lubrication with the carrier housing.

21 Claims, 3 Drawing Sheets

AUXILIARY LUBRICATION PUMP FOR CARRIERS

TECHNICAL FIELD

The subject invention relates to an auxiliary lubrication pump that is used to more effectively control fluid flow within a carrier assembly.

BACKGROUND OF THE INVENTION

Carrier assemblies for drive axles include a carrier housing with an internal cavity that receives a gear assembly. The gear assembly drives output shafts, which in turn are coupled to drive vehicle wheels. The gear assembly must be properly lubricated to avoid premature wear and failure. The internal cavity is filled to a certain level with lubricating fluid such that the gear assembly can be lubricated as gear components rotate within the internal cavity.

One disadvantage with current configurations is efficiency losses at the gear assembly that result from churning of the lubricating fluid. Further, excessive churning of the lubricating fluid may cause foaming of the fluid and can lead to inadequate lubrication coverage for gear components, resulting in premature wear. The effects of churning losses are even greater when narrow package carrier configurations are used.

Thus, there is a need for an improved lubricating method and apparatus for a carrier assembly that avoids the problems set forth above.

SUMMARY OF THE INVENTION

A carrier assembly includes an auxiliary lubrication pump that lubricates gear components positioned within an internal cavity of a carrier housing. A differential gear assembly is positioned within the internal cavity to rotate about an axis. The auxiliary lubrication pump includes a first gear that is driven by the differential gear assembly about the axis and a second gear that is driven by the first gear. The first and second gears of the auxiliary lubrication pump cooperate to direct and control lubrication within the carrier housing.

In one example, the carrier assembly includes a sump that is located within the internal cavity, and a reservoir that is separated from the sump by an orifice. The auxiliary lubrication pump includes a pump housing that is positioned within the sump. The pump housing has a pump inlet and a pump outlet. Lubricant flows from the sump into the pump inlet and is drawn across teeth of the first gear. As lubricant is drawn across the teeth, some lubricant travels to the outlet or discharge while some continues to travel to an inlet side. This action removes air from the passing teeth causing the discharge to be mostly lubricant.

In one example, the auxiliary lubrication pump includes a by-pass loop member having a scavenging port located near the pump inlet and a suction port located at a mesh point between the first and second gears. The scavenging port draws lubricant across the teeth of the first gear and the suction port provides suction to draw the lubricant to the discharge port.

In one example, the auxiliary lubrication pump includes a discharge member that has a discharge port positioned between the scavenging and suction ports. The discharge member directs lubricant from the discharge port, out of the pump outlet, and to the reservoir.

BRIEF DESCRIPTION OF THE DRAWINGS

Features of the present invention can be best understood from the following specification and drawings, the following of which is a brief description.

DETAILED DESCRIPTION OF THE PREFERRED EMBODIMENT

Figure 1:
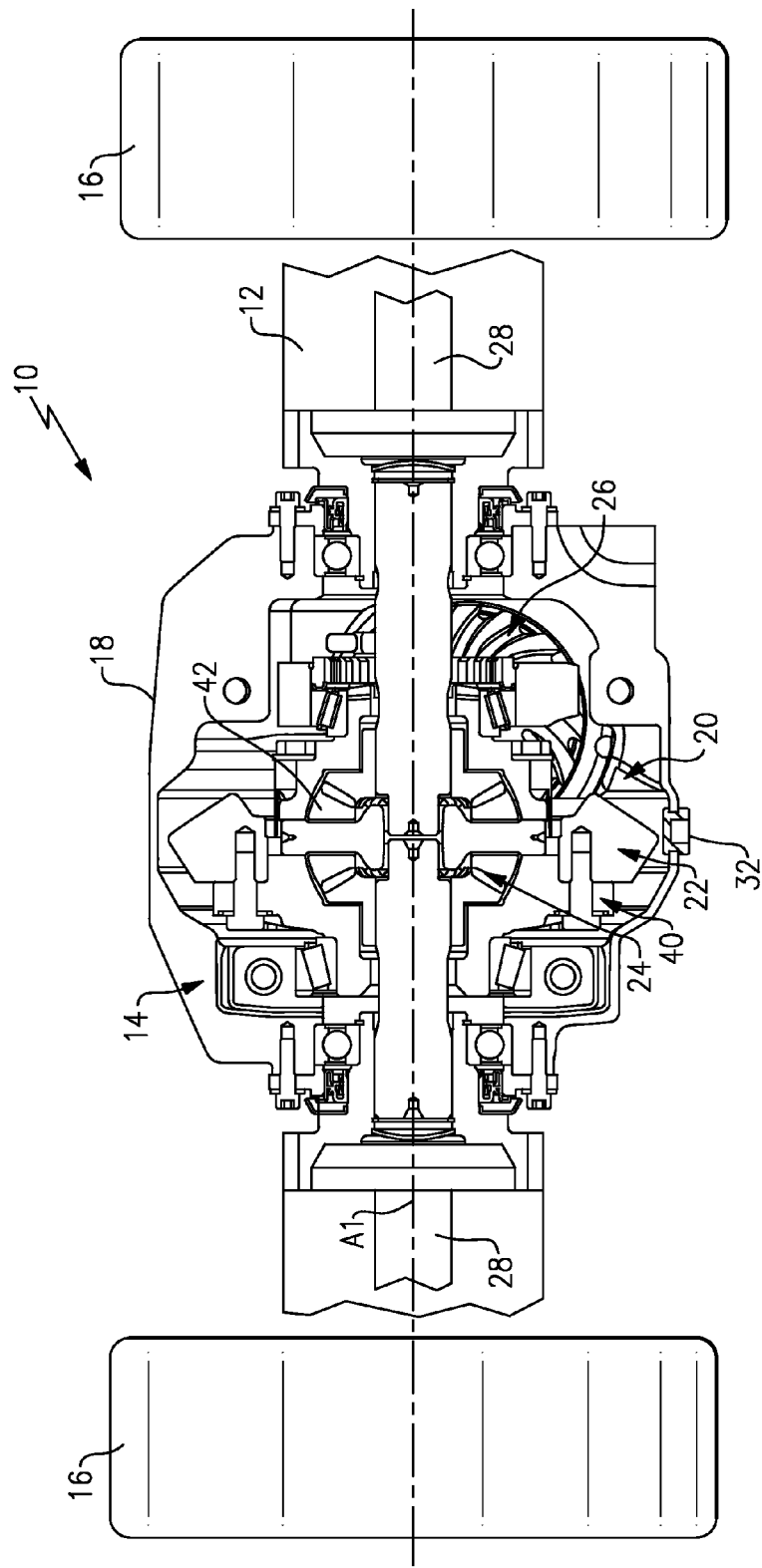
FIG. 1 is a schematic view of an axle and a carrier assembly with an auxiliary lubrication pump.

A drive axle 10, shown in FIG. 1, includes an axle housing 12 with a carrier assembly 14 that is used to drive a pair of laterally spaced vehicle wheels 16. The carrier 14 includes a carrier housing 18 that can be formed as part of the axle housing 12 or which can be a separate housing that is attached to the axle housing 12. The carrier housing 18 defines an internal cavity 20 that receives a gear assembly 22. In the example shown, the gear assembly 22 comprises a differential assembly 24 that receives driving input from an input gear assembly 26. The differential assembly 24 is coupled to drive a pair of axle shafts 28, which in turn drive the vehicle wheels 16. The axle shafts 28 extend in a lateral direction across a vehicle width.

The internal cavity 20 is partially filled with a lubricant, such as oil for example, to lubricate the gear assembly 22. An auxiliary lubrication pump 30 (FIG. 2) is positioned within the internal cavity 20 and is used to pump fluid from a sump area to reduce churning losses while still providing sufficient lubrication to the gear assembly 22. A drain plug 32 is mounted to the carrier housing 18 to allow the lubricating fluid to be drained from the carrier housing 18. It should be understood that while the auxiliary lubrication pump 30 and carrier assembly 14 are shown as part of a rigid drive axle with an axle housing 12 extending between vehicle wheels 16, the auxiliary lubrication pump and carrier assembly could be utilized in many other axle configurations, such as a subframe mounted carrier as used in an independent suspension configuration for example.

Figure 2:
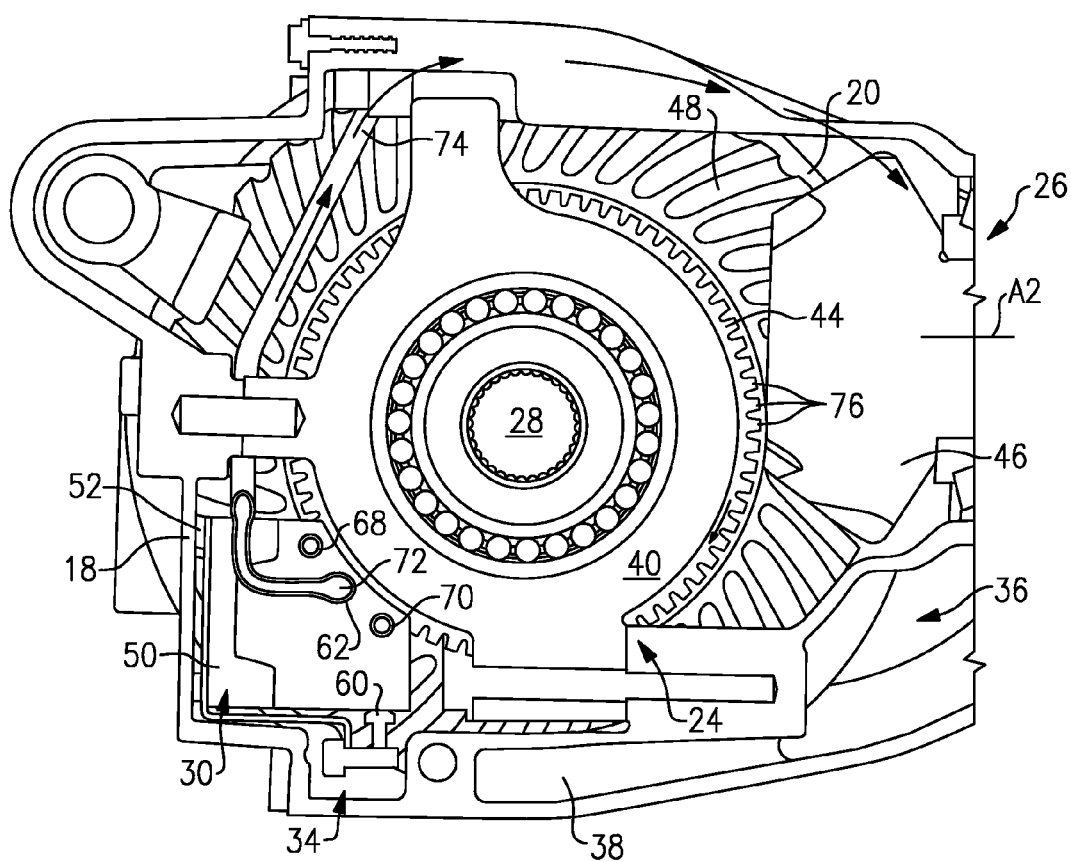
FIG. 2 is a partial cross-sectional view of a carrier with the auxiliary lubrication pump.
Figure 3:
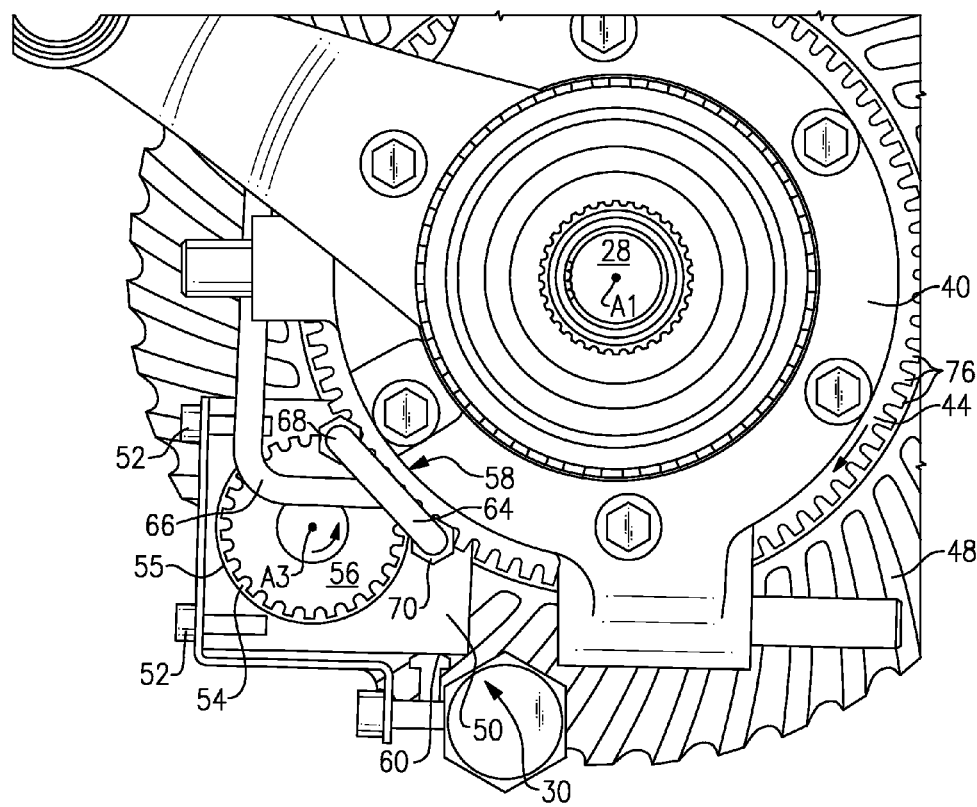
FIG. 3 is a cross-sectional view similar to that of FIG. 2 but showing an interior of the auxiliary lubrication pump.

The auxiliary lubrication pump 30 and carrier assembly 14 are shown in greater detail in FIGS. 2 and 3. The internal cavity 20 of the carrier housing 18 is compartmentalized to form a sump 34 and a reservoir 36 that are separated from each other by an orifice 38.

The differential assembly 24 includes a differential case 40 that supports differential gears 42 for rotation about a differential axis of rotation A1 (FIG. 1) that extends in a lateral direction across a vehicle width. The auxiliary lubrication pump 30 includes a first gear 44 that is fixed for rotation with the differential case 40 about the differential axis of rotation A1. The first gear 44 can be separately attached to, or integrally formed with the differential case 40. The differential case 40 is driven by the input gear assembly 26.

As shown in FIG. 2, the input gear assembly 26 includes a pinion gear 46 that receives driving input from a vehicle power source such as an engine or electric motor for example, and a ring gear 48 that is fixed for rotation with the differential case 40. The pinion gear 46 rotates about a pinion axis of rotation A2 that extends in a longitudinal direction along a vehicle length. The ring gear 48 can be integrally formed with the differential case 40 as a single-piece component, or the ring gear 48 could be separately attached to the differential case 40. The ring gear 48 rotates about the differential axis of rotation A1. The pinion gear 46 directly drives the ring gear 48, which in turn rotates the differential case 40 and the associated first gear 44 of the auxiliary lubrication pump 30.

The auxiliary lubrication pump 30 includes a pump housing 50 that is attached to the carrier housing 18 with a plurality of fasteners 52. As shown in greater detail in FIG. 3, the pump housing 50 defines an internal cavity 54 that receives a second gear 56 that is supported for rotation about a third axis A3 that extends in a lateral direction. The internal cavity 54 is generally circular and is bounded at least in part by a close-fitting wall portion 55 that is positioned very close to teeth of the second gear 56. The differential axis of rotation A1 and the third axis A3 are spaced apart from and parallel to each other, and also are both transversely orientated to the pinion axis of rotation A2. The first gear 44 directly meshes with the second gear 56 at a mesh point 58.

Figure 4:
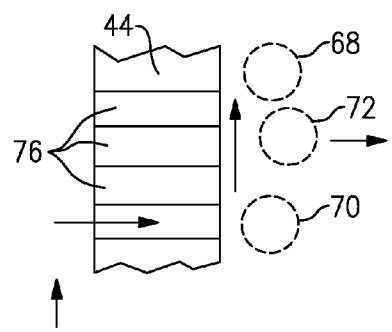
FIG. 4 is a schematic representation of lubricant flow as directed by the auxiliary lubrication pump.

The pump housing 50 includes a pump inlet 60 that is located at a bottom of the sump 34 and a pump outlet 62 (FIG. 2) that is in fluid communication with the reservoir 36. The auxiliary lubrication pump 30 also includes a by-pass loop member 64 and a discharge member 66. In one example, the by-pass loop member 64 comprises a tube having a suction port 68 and a scavenging port 70, and the discharge member 66 comprises a tube having a discharge port 72 associated at the pump outlet 62 and an outlet port 74 to the reservoir 36. The by-pass loop member 64 and the discharge member 66 cooperate to draw lubricant across teeth 76 (FIG. 4) of the first gear 44 to evacuate the sump 34 to reduce churning and to further lubricate the gear assembly 22.

In the example shown, the discharge port 72 is positioned between the scavenging 70 and suction 68 ports. As shown, the discharge port 72 is vertically higher than the scavenging port 70, and the suction port 68 is positioned vertically higher than the discharge port 72. Further, the ports 68, 70, 72 are circumferentially spaced apart from each other about an outer circumference of the first gear 44 which is defined by a radius extending from the differential axis of rotation A1.

Operation of the auxiliary lubrication pump 30 is as follows. In the example shown in FIGS. 2 and 3, the first gear 44 is shown rotating in a clockwise (CW) direction about the differential axis of rotation A1 and the second gear 56 is rotating in a counter-clockwise (CCW) direction about the third axis A3. Lubricant that fills the sump 34 is drawn into the pump inlet 60, which is positioned on one lateral side of the first gear 44. The lubricant flows from the pump inlet 60 through the pump housing 50 and across the teeth 76 of the first gear 44 to an opposite lateral side of the first gear 44.

The lubricant proceeds on the teeth 76 until the lubricant reaches the mesh point 58 between the first 44 and second 56 gears. The suction port 68 of the by-pass loop member 64 is positioned on a suction side of the mesh point 58. The scavenging port 70, i.e. an opposite end of the by-pass loop tube, is positioned near the pump inlet 60. The scavenging port 70 pulls oil across the teeth 76. Some of the oil also proceeds across the moving teeth 76 to the by-pass loop member 64.

Also positioned near the mesh point 58 is the discharge port 72 at the pump outlet 62. Lubricant exits at or near the mesh point 58 and is pushed into the discharge member 66 to exit the outlet port 74 to the reservoir 36. The lubricant returns to the sump 34 from the reservoir 36 via the orifice 38.

As such, the auxiliary lubrication pump 30 comprises a partially baffled gear pump that operates from the differential axis of rotation A1 and serves to evacuate the sump area to reduce churning losses. When this pump 30 is used in a configuration that does not include a bypass, due to open gear teeth, discharge could include approximately 50% air. This configuration is useful when baffling the two meshing gears is impractical, such as when one gear is much larger than the other gear or when less flow is desired. When pump 30 is used in combination with a bypass, most of the air can be scavenged from the passing teeth of the two meshing gears. The discharge in this case is mostly oil. Scavenging is accomplished by routing the inlet across the teeth. This configuration is useful when baffling both gears is impractical and discharge is desired to be mostly oil.

In one example, the pump 30 can be used with a drain plug configuration such as that described in U.S. patent application Ser. No. 11/782,685, filed on Jul. 25, 2007, which is assigned to the assignee of the present invention and is herein incorporated by reference. When used in combination with this drain plug configuration, the carrier is capable of directing lubricant where necessary, while operating with a relatively "dry" sump.

Further, as discussed above, the auxiliary lubrication pump 30 can be especially useful for carriers having a narrow packaging width such as that used with an independent suspension. In such a configuration, using a reservoir area that is separate from a sump area that houses rotating components allows for sufficient fill while reducing the churning losses.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A carrier assembly comprising:
a carrier housing defining an internal cavity that receives a gear assembly that rotates about an axis;
a sump located within said internal cavity at the gear assembly;
a reservoir located within said internal cavity for holding a lubricating fluid, said reservoir being separate from said sump; and
an auxiliary lubrication pump positioned within said sump, said auxiliary lubrication pump comprising a partially baffled gear pump that includes at least a first gear that rotates about said axis and a second gear driven by said first gear, and wherein said auxiliary lubrication pump includes a pump housing that closely surrounds said second gear, and wherein said pump housing includes a pump inlet that receives lubricant from the sump and a pump outlet from which the lubricant exits said pump housing, and wherein said first gear and said second gear cooperate to pump lubricant from the sump to lubricate the gear assembly and return the lubricant to the reservoir.

2. The carrier assembly according to claim 1 wherein the gear assembly comprises a differential gear assembly including a differential case, said first gear being fixed for rotation with said differential case.

3. The carrier assembly according to claim 2 including an input gear set having a pinion in meshing engagement with a ring gear, said pinion to receive input from a driving power source and said ring gear to provide driving input to said differential gear assembly.

4. A carrier assembly comprising:
a carrier housing defining an internal cavity that receives a gear assembly that rotates about an axis, wherein said gear assembly comprises a differential gear assembly including a differential case;
a sump located within said internal cavity at the gear assembly;
a reservoir located within said internal cavity for holding a lubricating fluid, said reservoir being separate from said sump;

an auxiliary lubrication pump positioned within said sump, said auxiliary lubrication pump including at least a first gear that is fixed for rotation with said differential case about said axis and a second gear driven by said first gear, and wherein said first gear and said second gear cooperate to pump lubricant from the sump to lubricate the gear assembly and return the lubricant to the reservoir; and a pump housing having a pump inlet and a pump outlet, and including a by-pass loop member providing a suction port and a scavenging port that is positioned to draw lubricant across teeth of said first gear.

5. The carrier assembly according to claim 4 wherein said first gear directly drives said second gear at a mesh point, and wherein said suction port is positioned near said mesh point on a suction side of said mesh point, and wherein said scavenging port is positioned adjacent said pump inlet.

6. The carrier assembly according to claim 5 including a discharge member having a discharge port positioned adjacent said mesh point, said discharge member directing lubricant from said discharge port at said pump outlet to convey lubricant to said reservoir.

7. The carrier assembly according to claim 6 wherein said by-pass loop member comprises a first tube and said discharge member comprises a second tube separate from said first tube, and wherein said discharge tube is positioned between said suction port and said scavenging port.

8. The carrier assembly according to claim 4 wherein said pump housing includes mounting structure to be fixed to the carrier housing associated with a drive axle.

9. A wheel drive assembly comprising:
first and second axle shafts to drive first and second wheel assemblies, respectively;
a differential gear assembly that drives said first and said second axle shafts, said differential gear assembly defining an axis of rotation;
an input gear assembly that drives said differential gear assembly;
a housing defining an internal cavity that receives said differential gear assembly and said input gear assembly;
an auxiliary lubrication pump positioned within said internal cavity, said auxiliary lubrication pump comprising a partially baffled gear pump that includes at least a first gear that rotates about said axis of rotation and a second gear driven by said first gear, and wherein said auxiliary lubrication pump includes a pump housing that closely surrounds said second gear, and wherein said pump housing includes a pump inlet that receives lubricant from a sump and a pump outlet from which the lubricant exits said pump housing, and wherein said first gear and said second gear cooperate to pump lubricant out of the sump to lubricate said input and said differential gear assemblies; and
a discharge member having a discharge port associated with said pump outlet and an outlet port to a reservoir.

10. The wheel drive assembly according to claim 9 wherein said sump is located within a bottom of said internal cavity and wherein said reservoir is located within said housing for holding lubricant, said reservoir being separated from said sump by an orifice.

11. The wheel drive assembly according to claim 9 wherein said differential gear assembly includes a differential case to support a plurality of differential gears, and wherein said input gear assembly comprises a pinion gear to receive driving input from a power source and a ring gear that is fixed for rotation with said differential case.

12. The wheel drive assembly according to claim 11 wherein said auxiliary lubrication pump is within said sump and fixed to said housing that defines said internal cavity, and wherein said first gear is fixed for rotation with said differential case and said second gear is positioned within said pump housing.

13. A wheel drive assembly comprising:
first and second axle shafts to drive first and second wheel assemblies, respectively;
a differential gear assembly that drives said first and said second axle shafts, said differential gear assembly defining an axis of rotation, and wherein said differential gear assembly includes a differential case to support a plurality of differential gears;
an input gear assembly that drives said differential gear assembly, and wherein said input gear assembly comprises a pinion gear to receive driving input from a power source and a ring gear that is fixed for rotation with said differential case;
a housing defining an internal cavity that receives said differential gear assembly and said input gear assembly; and
an auxiliary lubrication pump positioned within said internal cavity, said auxiliary lubrication pump including at least a first gear that rotates about said axis of rotation and a second gear driven by said first gear, and wherein said first gear and said second gear cooperate to pump lubricant out of a sump to lubricate said input and said differential gear assemblies, and wherein said auxiliary lubrication pump includes a by-pass tube providing a suction port and a scavenging port that is positioned to draw lubricant across teeth of said first gear, and a discharge tube having a discharge port positioned between said scavenging port and said suction port, wherein said discharge tube directs lubricant from said discharge port at said pump outlet to convey lubricant to a reservoir.

14. The wheel drive assembly according to claim 13 wherein said suction port is positioned at said mesh point, said scavenging port is positioned adjacent said pump inlet to draw lubricant across said teeth, and said discharge port is positioned vertically between said scavenging port and said suction port.

15. A method of pumping lubricant from an auxiliary lubrication pump positioned in a sump in a carrier housing comprising the steps of:
(a) providing a differential gear assembly in an internal cavity of the carrier housing to rotate about an axis, and configuring the auxiliary lubrication pump as a partially baffled gear pump including at least a first pump gear and a second pump gear;
(b) driving the first pump gear with the differential gear assembly to rotate about the axis;
(c) driving the second pump gear with the first pump gear to lubricate gear components located within the carrier housing by drawing lubricant across teeth of the first pump gear to direct the lubricant to the gear components;
(d) providing the auxiliary lubrication pump with a pump housing that closely surrounds the second pump gear, the pump housing including a pump inlet that receives lubricant from the sump, a pump outlet from which lubricant exits the pump housing, and a suction port; and
(e) positioning the suction port on a suction side of a mesh point between the first and second pump gears.

16. The method according to claim 15 including positioning the pump housing in the sump, fixing the first pump gear for rotation with a differential case of the differential gear assembly, positioning the second pump gear within the pump housing, and directly meshing the first pump gear with the second pump gear to define the mesh point.

17. A method of pumping lubricant from an auxiliary lubrication pump positioned in a sump in a carrier housing comprising the steps of:
   (a) providing a differential gear assembly in an internal cavity of the carrier housing to rotate about an axis;
   (b) positioning a pump housing in the sump and fixing a first pump gear for rotation with a differential case of the differential gear assembly;
   (c) driving the first pump gear with the differential gear assembly to rotate about the axis;
   (d) positioning a second pump gear within the pump housing, and directly meshing the first pump gear with the second pump gear at a mesh point to drive the second pump gear with the first pump gear to lubricate gear components located within the carrier housing by drawing lubricant across teeth of the first pump gear to direct the lubricant to the gear components; and
   (e) installing a by-pass tube in the pump housing, the by-pass tube including a suction port and a scavenging port that is positioned to draw lubricant across teeth of the first pump gear, and installing a discharge tube in the pump housing, the discharge tube having a discharge port positioned between the scavenging port and the suction port.

18. The carrier assembly according to claim 1 wherein said pump housing includes a suction port that is positioned on a suction side of a mesh point between said first and second gears.

19. The carrier assembly according to claim 18, including a discharge member having a discharge port associated with said pump outlet and an outlet port to the reservoir.

20. A wheel drive assembly comprising:
   first and second axle shafts to drive first and second wheel assemblies, respectively;
   a differential gear assembly that drives said first and said second axle shafts, said differential gear assembly defining an axis of rotation;
   an input gear assembly that drives said differential gear assembly;
   a housing defining an internal cavity that receives said differential gear assembly and said input gear assembly; and
   an auxiliary lubrication pump positioned within said internal cavity, said auxiliary lubrication pump comprising a partially baffled gear pump that includes at least a first gear that rotates about said axis of rotation and a second gear driven by said first gear, and wherein said auxiliary lubrication pump includes a pump housing that closely surrounds said second gear, and wherein said pump housing includes a pump inlet that receives lubricant from a sump and a pump outlet from which the lubricant exits said pump housing, and wherein said pump housing includes a suction port that is positioned on a suction side of a mesh point between said first and second gears, and wherein said first gear and said second gear cooperate to pump lubricant out of the sump to lubricate said input and said differential gear assemblies.

21. The wheel drive assembly according to claim 20 wherein said pump housing includes a scavenging port to draw lubricant across teeth of said first gear, and including a by-pass loop member that connects said scavenging port and said suction port.

* * * * *